United States Patent
Lindsey

[15] 3,704,406
[45] Nov. 28, 1972

[54] GYRO SERVO CONTROL SYSTEM & STRUCTURE

[72] Inventor: James M. Lindsey, Houston, Tex.
[73] Assignee: Sperry Sun Well Surveying Company, Sugar Land, Tex.
[22] Filed: Nov. 21, 1969
[21] Appl. No.: 879,006

[52] U.S. Cl. .................318/648, 318/671, 318/684, 318/689, 74/5.4, 74/5.6
[51] Int. Cl. .............................................B64c 17/02
[58] Field of Search ......74/5.6, 5.4, 5; 318/584, 585, 318/586, 580, 698, 671, 684, 689

[56] References Cited

UNITED STATES PATENTS

| | | |
|---|---|---|
| 2,683,247 | 7/1954 | Wiley .........................318/648 |
| 3,477,298 | 11/1969 | Howe ............................74/5.6 |
| 3,422,686 | 1/1969 | Unruh ...........................74/5.6 |
| 3,444,745 | 5/1969 | Wing.............................74/5.6 |
| 3,456,511 | 7/1969 | Clark et al. ................74/5.6 X |
| 3,499,332 | 3/1970 | Fingerette et al.............74/5.6 |
| 3,501,967 | 3/1970 | De Cotiis.......................74/5.6 |
| 3,543,587 | 12/1970 | Kawada........................74/5.6 |

Primary Examiner—T. E. Lynch
Attorney—George L. Church, Donald R. Johnson, Wilmer E. McCorquodale, Jr. and John E. Holder

[57] ABSTRACT

In a system for controlling the tilt of a rotor on a gyro, a sensing device for detecting tilt, together with electrical circuit components for providing an error signal are mounted upon the rotor housing. The error signal for providing a corrective signal to a torque motor control system is transmitted via a circuit supplying rotor power. By using the power supply path to transmit the error signal, it is unnecessary to use any sort of friction producing physical attachment with the components of the gyro in order to transmit such error signal to the torque motor control system.

17 Claims, 5 Drawing Figures

INVENTOR

JAMES M. LINDSEY

*John E. Holder*

ATTORNEY

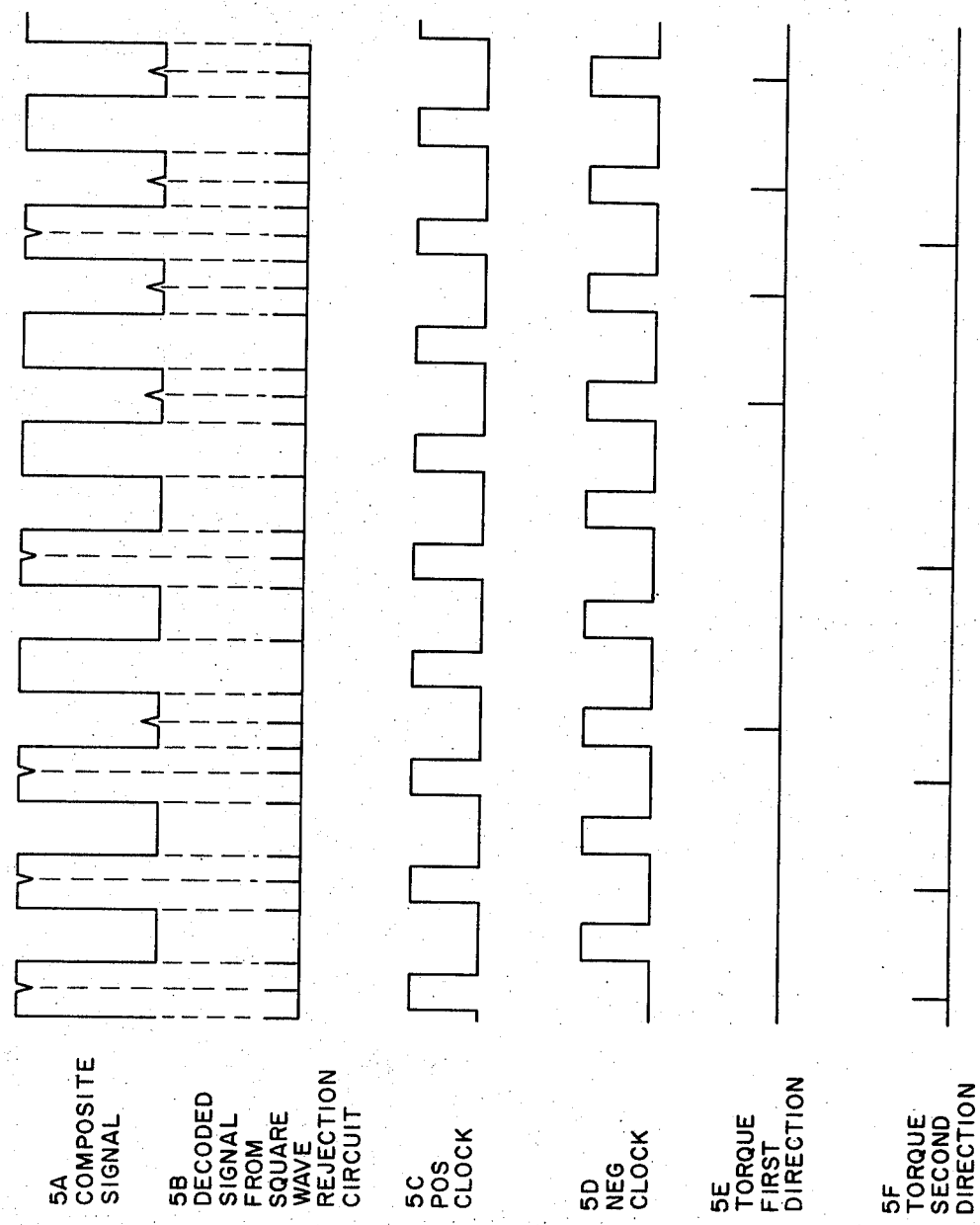

GYRO SERVO CONTROL SYSTEM & STRUCTURE

BACKGROUND OF THE INVENTION

This invention relates to a control system, and more particularly to a control system for operating a control function over the same circuit path which supplies other signal functions. A similar control system is set forth in applicant's copending U.S. application Ser. No. 879,007.

Such a system finds application in gyro instruments. Gyros are utilized in borehole survey instruments in conjunction with inclinometers to determine the direction of a borehole. The gyro acts as a compass while the inclinometers measure the angular relationship of the borehole with a vertical axis. Since the borehole is normally not in a vertical plane, the determination of direction is complicated by the necessity of calculating the angular relationship of the borehole axis and the gyro rotor axis, while projecting the gyro rotor axis into a horizontal plane, to provide true directional measurement.

One method for minimizing error in calculating such angular relationships is to maintain the rotor axis in a plane perpendicular to the vertical axis of the gyro or the borehole axis. Thus the borehole axis angle, which is measured by inclinometers is always 90° to the gyro rotor axis. However, this method requires that the rotor axis be forced into an ever changing tilt plane. When the tilt axis is not in the same vertical plane as the rotor axis, such forces cause violent horizontal displacements of the rotor axis, and thus of the outer gimbal, which displacements must be determined and accounted for. Such displacements can be calculated if all parameters are known, but it must be established when the movement starts and stops. This can only be determined when the instrument is on station and at rest.

A better procedure is to provide a full time system for counterbalancing any unleveling forces which tend to move the rotor axis from a horizontal plane, and to minimize the application of outside forces. When the rotor axis is maintained in such a horizontal plane, relating directional information in this plane is simplified. In applying resistive forces to the vertical axis of the gyro in order to control tilt of the rotor, slip rings or any other type of physical attachment to the vertical or horizontal components of a gyro are undesirable because they do cause friction to some degree, which creates drift and tilt in the gyro. It is therefore desirable to find means of electrically transferring a control signal from these components which is indicative of the tilt of the components to control a torque motor or the like while minimizing frictional forces applied to the gyro components. The torque motor applies resisting forces to the vertical axis of the gyro to maintain the rotor axis in the desired positional relationship, such as in the horizontal position described above.

It is therefore an object of the present invention to provide a new and improved control system having such capability.

SUMMARY OF THE INVENTION

With this and other objects in view, the present invention contemplates a control system responsive to a parameter sensing device. Circuitry in the system develops a control signal in response to the sensed parameter which in turn is superimposed on a power supply signal for transmittal to a control function. In a gyro system the control signal is developed in response to rotor tilt. Upon the occurrence of such tilt, an electrical circuit on the gyro rotor develops the control signal which is superimposed onto the same conductor path which provides power to the rotor motor. This control signal is then separated from the power supply signal for controlling the operation of a torque motor. The torque motor applies a torque to an axis of the gyro, which in turn causes the rotor to precess to a desired position.

A complete understanding of this invention may be had by reference to the following detailed description, when read in conjunction with the accompanying Drawings illustrating embodiments thereof.

DESCRIPTION OF THE DRAWINGS

FIG. 5A–5F are diagrammatic representations of control signals at various points within the system.

DESCRIPTION OF THE PREFERRED EMBODIMENTS

Figure 1:
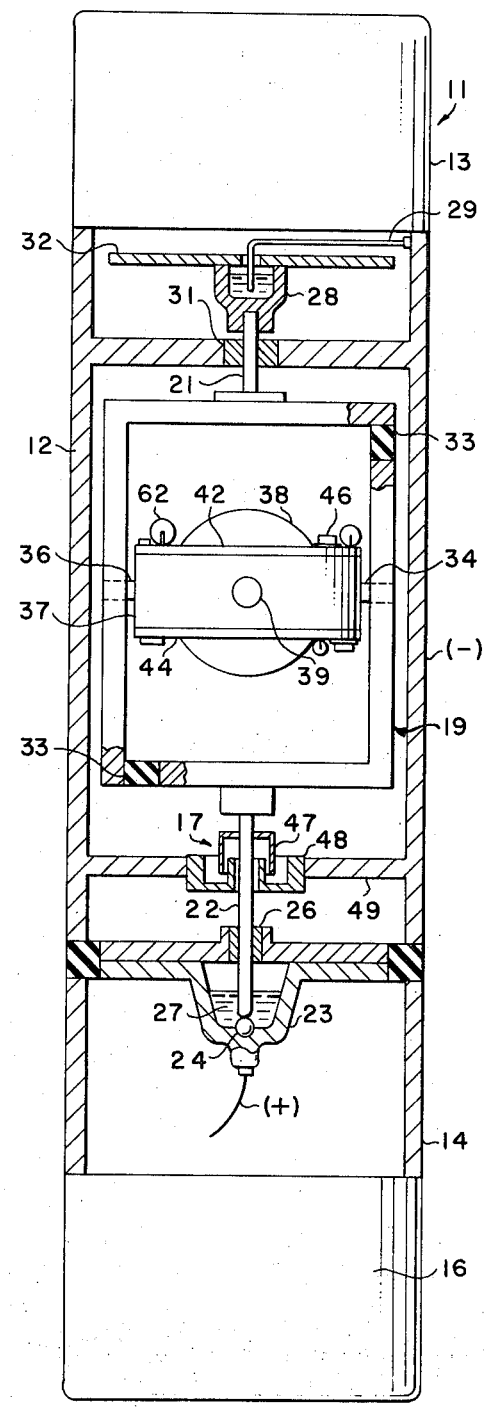
FIG. 1 is a partial cross-sectional view of a wellbore instrument embodying a control system in accordance with the present invention.

Referring first to FIG. 1 of the Drawings, a wellbore tool 11 is shown having a housing 12 for encasing a gyro instrument. A photographic recording apparatus or the like may be mounted in a section 13 above the gyro for making readings indicative of the gyro position. Alternatively, circuitry may be provided for transmitting a signal to the surface, which signal proves an instantaneous recording representing the gyro position. Below the instrument section is a power supply or inverter unit 14 and circuitry 16 for controlling the operation of a torqueing motor 17 attached to a vertical shaft of the gyro. The outer gimbal 19 of the gyro has upwardly and downwardly extending vertical shafts 21, 22 respectively, which in turn are supported by bearings for rotation within the instrument housing. At the lower end of the lower vertical shaft 22, a cup 23 is provided within the housing for receiving the lower end of the shaft 22. A ball 24 is positioned between the lower end of the shaft and the bottom of the cup to furnish a pivotal support for the shaft. Annular bearings 26 are positioned about the shaft for support in a horizontal direction. The cup 23 is filled with mercury or some such conducting fluid 27, so that an electrical current applied to the bottom of the cup is transmitted by means of the conducting fluid to the vertical shaft 22 of the gyro.

At the upper end of the gyro, the upwardly extending vertical shaft 21 likewise has a mercury filled cup 28 mounted thereon. A wiper wire 29 extends inwardly from the wall of the housing 12 and is bent to extend downwardly into the mercury filled cup 28 to form a second conducting path to the gyro. The upper shaft 21 is supported in a horizontal direction by an annular bearing 31. An instrument face 32 may be connected to the upper end of the cup or shaft to provide indications of the gyro position. Photographic apparatus in section 13 is used to record the position of the instrument face. The vertical shafts 21, 22 are in electrical communication with the outer gimbal of the gyro. Insulating members 33 are positioned in the gimbal walls so that the gimbal is divided into two separate conducting paths. These conducting paths in turn are in communication with opposed horizontal shafts 34, 36 which are received within opposed walls of the outer gimbal and which extend inwardly to support an inner gimbal 37 of the gyro. The inner gimbal of the gyro is pivotally mounted on such horizontal shafts 34, 36, and supports a rotor (not shown) within in rotor housing 38. The rotor is mounted above another horizontal shaft 39 perpendicular to the shafts 34, 36 of the inner gimbal. As is well known in the construction of such gyro instruments, the inner gimbal 37 is divided into separate insulated portions similarly to the outer gimbal, which portions provide separate conducting paths from the shafts 34, 36 to the rotor for supplying power to the rotor.

Circuit boards 42, 44 are mounted on the top and bottom sides respectively of the inner gimbal 37. The circuit boards have a cut out portion for permitting the rotor of the gyro to extend therethrough. Electrical circuit devices 46 which will be described hereinafter with respect to FIG. 2 of the Drawings, are physically mounted on the circuit boards. The circuit devices mounted on the boards include a tilt detector, which in conjunction with other circuit devices provide a signal indicative of the tilt of the rotor. The signal is fed to the torqueing motor 17 shown mounted about the downwardly extending vertical shaft 22 of the outer gimbal. The torqueing motor is comprised of a rotor 47 which is attached to the vertical shaft, and a stator winding 48 which is positioned on a mounting 49 extending within the instrument housing.

Figure 4:
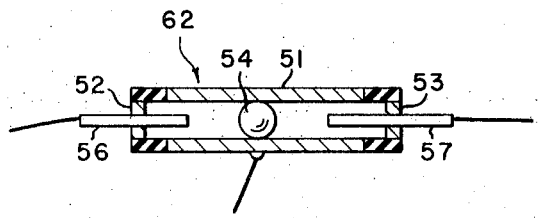
FIG. 4 shows a cross-sectional view of a level detector for use with the control systems of the present invention.

As has been described with respect to the Background of the Invention, it is seen that is desirable to maintain the rotor housing in either a true horizontal position relative to earth, or in some fixed position with respect to the vertical or outer gimbal. It is first necessary to detect any changes in the attitude of the inner gimbal with respect to such fixed or desired position in order to make corrections, through a torqueing motor system, for such changes. Referring next to FIG. 4 of the Drawings, a level or tilt detecting device 62 is shown for sensing such changes in the positional attitude of the inner gimbal. The tilt detector consists of a hollow cylinder 51 having closed ends 52, 53 electrically insulated from the cylinder. The walls of the cylinder are made of an electrically conducting material. A ball 54, likewise made of a conducting material, is positioned within the cylinder, and is free to roll up and down the length of the cylinder. A pair of conducting rods 56, 57 extend through the end walls 52, 53, respectively, of the cylinder into its interior bore. These rods limit the freedom of movement of the ball in the cylinder. The rods are connected to wires which, in conjunction with electrical circuitry, provides a means for opening and closing a conductive path comprised of one of the rods, the ball, and the wall of the cylinder itself. As viewed in FIG. 4, it is readily seen that if the cylinder were to tilt in one direction or the other, the ball would roll into contact with the end of one of the rods to provide an electrical conducting path between the rod and the wall of the cylinder. The use of this tilt detecting device in conjunction with the control system described herein will be set forth in greater detail with respect to the circuit diagrams.

Figure 2:
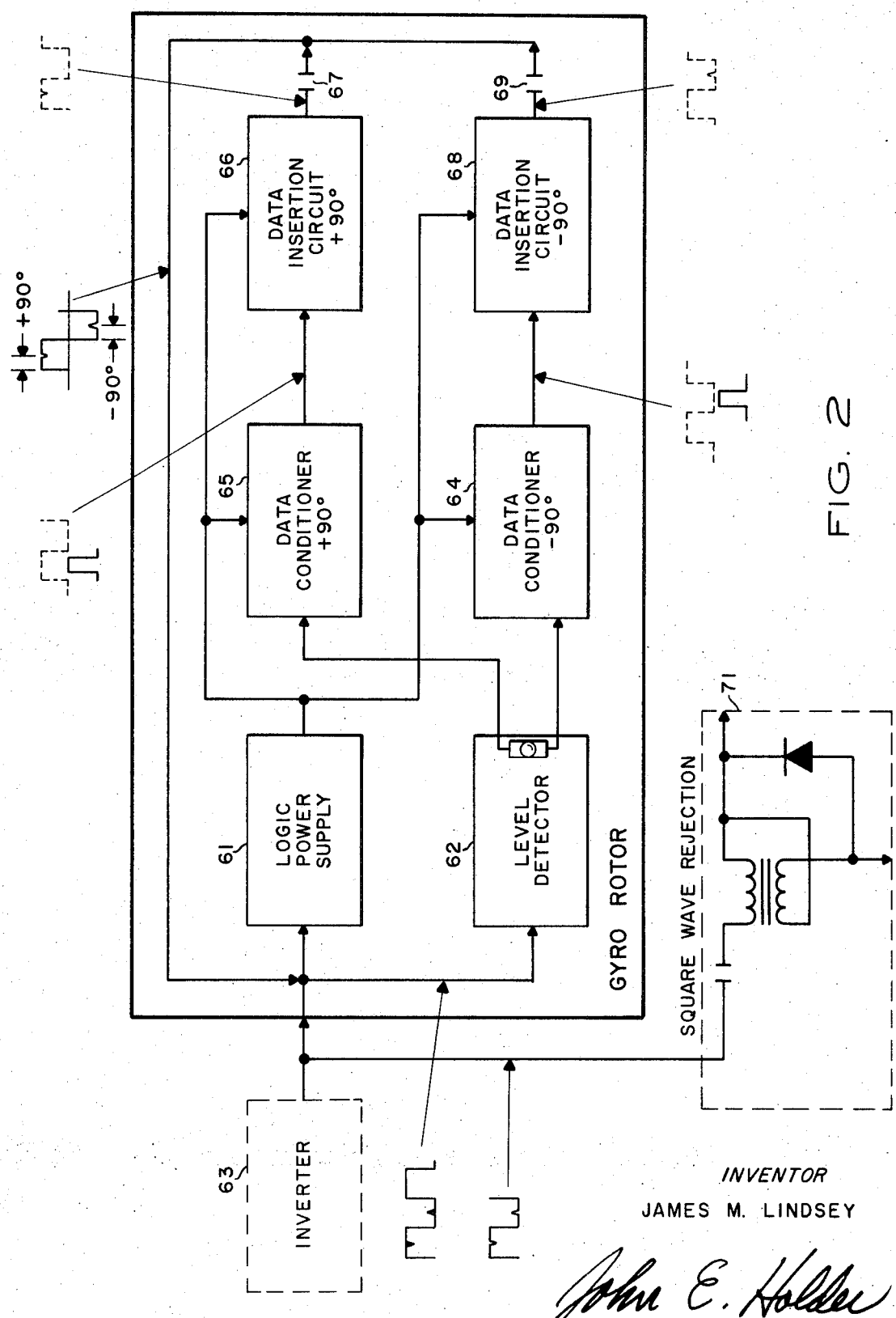
FIG. 2 is a schematic circuit diagram of electronic circuitry mounted upon the gyro rotor shown in FIG. 1.

Referring next to FIG. 2 of the Drawings, the electrical circuitry portion of the system, which is mounted upon the circuit boards 42, 44, on the rotor housing is shown enclosed by a heavy line. Such circuit consists of a logic power supply 61 for furnishing DC power to the components of the system mounted on the rotor. In addition, the level detector 62, such as shown in FIG. 4, provides means for passing a signal form an inverter 63 to parallel data conditioner and and insertion circuits. The above circuitry transforms the signal indicative of tilt into a control function which, applied back to the inverter signal, is used for controlling a torqueing motor.

The inverter 63 supplies a 1,200 cycle square wave signal for driving the gyro rotor. The inverter signal is applied to the rotor in the manner described above by means of separate insulated sections of the gimbal housing for providing current paths. Since the square wave signal is available to the rotor, the signal is easily furnished to the circuitry mounted on the circuit boards, which in turn are positioned on the rotor housing. The circuit boards are made of a phenolic, plastic, glass, or other such insulating material, and leads extending from the integrated components connect with small wires on the boards which in turn are connected to the separate insulated portions of the rotor housing.

Referring again to FIG. 2, the inverter 63 is shown providing a signal to the rotor housing which is represented by the heavy line in FIG. 2. Such inverter signal is applied first to the logic power supply 61, which in turn generates a DC voltage for driving the components of the system. In addition, the inverter signal is fed to the level detector 62, which has been described with respect to FIG. 4. Although the rotor is described herein as being operated by a square wave signal, the system can, with modification, be used when the rotor is driven by other types of signal such as a DC voltage. Again, although the system will be described herein as maintaining the rotor in a true horizontal position, it is readily seen that the rotor could be maintained in any desirable position with a tilt detector or the like being determinative of the movement of such rotor housing from that desired position. The level detector 62 which is mounted on the rotor can be any of a number of devices having the capability of detecting tilt, and may be either of a variable impedance configuration, or a straight on-off-on type switch of the single pole double throw configuration, as is shown in FIG. $. In the switch in FIG. 4, the conducting walls of cylinder 51 provide a common conducting path which is tied to ground. If the rotor tilts in one direction or the other, it grounds that side of the switch.

Each side or pole of the level detector or switch 62 is connected to one side of a pair of two parallel gateing networks, or data conditioners 64, 65. The other side of the two networks are connected to a drive signal that originates in the inverter. The data conditioners are comprised of a series of monostable flip-flops (one shots) that cause a pulse to occur in time relationship with the positive or negative 90° portion of the square wave signal received from the inverter. The data conditioner network receives the square wave signal from the level detector. As the inverter signal goes positive, a first one shot in the data conditioner conducts for the first 90° of the signal. The output of this one shot drives a second one shot within the network that conducts for a 10 microsecond period. Thus, the resultant output of the data conditioner circuit is a ten microsecond pulse that occurs in timed relationship with the +90° portion of the inverter signal. In FIG. 2, a diagrammatic representation of the signal appears near the output line from the data conditioners 64 and 65. The dotted line represents the time phase of the square wave from the inverter. The solid lines represent the 10 microsecond signal which is generated by the data conditioner and its time relation with the inverter signal. Thus the data conditioner 65 provides a 10 microsecond pulse in coincidence with the positive 90° position of the square wave from the inverter. This pulse is used to saturate a transistor in a data insertion circuit 66 that has, as its collector load, a capacitor 67 in series with the inverter signal line.

When the transistor saturates, it puts a spike or pulse on the square wave at the time it goes into saturation or in the above example, at the +90° portion of the inverter signal. The lower data conditioner network 64 is similar to the upper network, except that it causes the 10 microsecond pulse to occur on the negative going portion of the signal at a −90° position in the wave cycle. A corresponding data insertion circuit 68 and capacitor 69 apply a pulse to the inverter signal corresponding to the −90° portion of the signal. Diagrammatic wave forms and pulses are shown for various portions of the circuit. Should the level detector 62 be in a neutral position so as to not provide a conducting path to the data conditioner networks, then no pulse will be superimposed upon the square wave inverter signal.

In the operation of the apparatus described above, assume that the gyro rotor is tilting so that the upper data insertion network is not operated, and the lower data insertion network is operated. As the inverter square wave goes positive, no pulse is generated since the upper network is not receiving a signal from the level detector, and thus not providing a pulse in timed relationship to the positive going portion of the square wave. On the other hand, as the square wave goes negative, a −90° ten microsecond pulse is generated by data conditioner 64 in time relationship to the −90° position on the negative going portion of the square wave, which pulse is passed through the data insertion circuit 68 on to the inverter square wave. As long as the lower network is conducting, 10 microsecond pulses are received on the negative portion of the inverter square wave. If the lower network is not conducting and the upper network is conducting, then such 10 microsecond pulses are received on the 90° position of the positive going portion of the square wave from the upper data insertion circuit. In either event, the occurrence of such pulses on the inverter signal indicates the direction that the rotor is tilting from its desired position. If the pulses are appearing on the positive going portion of the square wave (+90°), the rotor is tilting in one direction. If the pulses are appearing on the negative going portion (−90°), then the rotor is tilted in the other direction. The important thing is that these signals, while being superimposed upon the gyro rotor power line, are now available in the inverter section of the tool, where they can be easily processed for controlling the torqueing motor.

Figure 3:
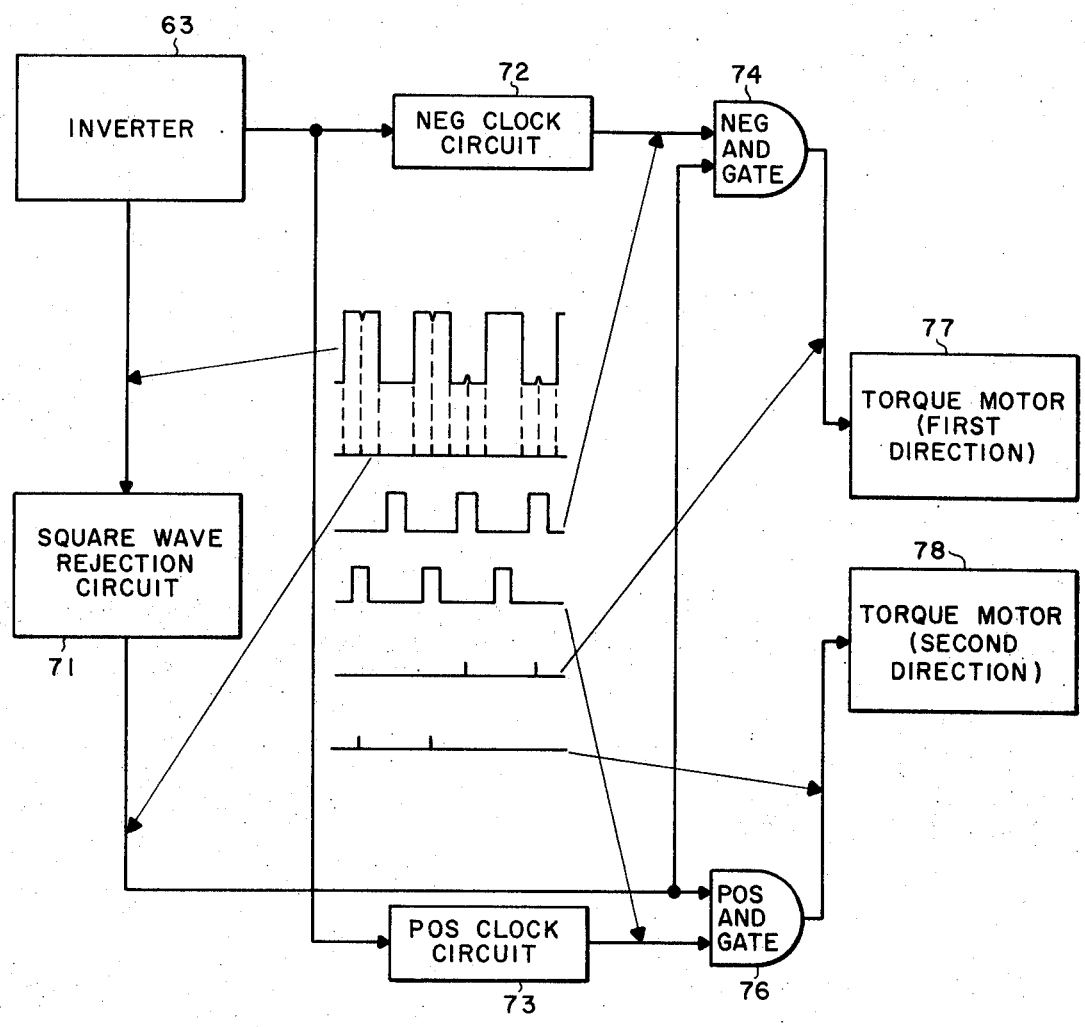
FIG. 3 is a circuit diagram of electrical circuitry for operating a control function removed from the gyro rotor.

Referring next to FIG. 3 of the Drawings, a torqueing motor control circuit is shown which is physically located in the inverter or circuitry section of the tool, below the gyro instrument section. A square wave rejection circuit 71, which is shown in greater detail in FIG. 2, is comprised of a transformer in conjunction with a capacitor, which develops a square wave that is 180° out of phase with the source inverter square wave, and adds the two together. The resulting signal output of the square wave rejection circuit is comprised of the data signal or pulse that is superimposed upon the square wave, together with a transient spike that occurs during the fast rise and decay of the square wave resulting in a series of spikes, as shown schematically in FIG. 3 and FIG. 5B. These pulses are in corresponding time relationship with their location upon the inverter signal, the latter being shown schematically in FIG. 3 with respect to the input line to the rejection circuit 71 from the inverter, and also in FIG. 5A. The appearance of the transient spikes in the output of the rejection circuit 71 can also be alleviated by the use of a sine wave for driving the gyro system, however, the square wave offers a more efficient means of operating the system and requires less components to be placed on the rotor housing.

The remaining portion of the torque motor control circuitry as shown in FIG. 3 functions to compare the output signal of the square wave rejection circuit with the inverter square wave to determine which data signals occur on the positive (+90°) portion of the wave, and which occur on the negative going portion (−90°) of the wave. The circuitry then functions to separate these two different data signals into parallel lines for controlling the torqueing motor to drive the motor either in a right or left hand rotating direction. The wave forms which result from the circuitry of FIG. 3 are shown in comparison in FIG. 5 of the Drawings. In conjunction with the square wave rejection circuit 71, a pair of clock circuits 72, 73 operate in conjunction with gateing networks 74, 76 to compare the output of the square wave rejection circuit to the inverter square wave. The positive clock circuit 73 clips the negative going portion of the inverter square wave to provide a positive going signal only during the durations that the inverter wave is positive going. (FIG. 5C). Likewise, the negative clock circuit 72 clips the positive going portion of the inverter square wave, and then inverts the remaining negative going portion to provide a positive signal during those time periods when the square wave from the inverter is negative going (FIG. 5D). The outputs of such clock circuits is shown in FIGS. 5C and 5D relative to the composite signal from the inverter as shown in FIG. 5A. The outputs of the negative and positive clock circuits are fed to the separate AND gates 74, 76, while a common signal to each of the AND gates is provided by the decoded signal from the square wave rejection circuit (FIG. 5B). The output waveform from the clock circuits is narrower in duration than the inverter square wave. Thus the AND gates only conduct when the data signal appears on the decoded signal and the gates do not conduct in response to transient spikes on the decoded signal. The output of each of these gates is a signal to the torque motor control which is corresponding to the pulses initially generated in the gyro section indicative of tilt in one or the other of the directions. For example, if a pulse from the square wave rejection circuit enters the AND gate 74 at the same time that the clock circuit 72 is providing a positive going signal to the AND gate, then the negative AND gate 74 will conduct and provide a pulse to a torque motor control 77 for turning the torque motor in a first direction (FIG. 5E). On the other hand, if a pulse from the square wave rejection circuit enters the AND gate 74 while no positive going signal from the clock circuit 72 is entering the AND gate, then such AND gate will not conduct. At the same time, however, if a signal from the square wave rejection circuit enters the positive AND gate 76 at the same time that the positive clock circuit 73 is provided a positive signal to the other side of the gate, then the gate will conduct and a pulse will be sent to a torque motor control 78 for operating the torque motor in a second or opposite direction (FIG. 5F).

In the operation of the circuit of FIG. 3 described above in conjunction with the foregoing circuits and apparatus, the level detector 62 is moved upon tilt of the inner gimbal 37 about its horizontal axis. Tilt of the level detector, for example, in a second direction, will close a circuit path to permit signals from the inverter 63 to be passed to the data conditioner 65. During this condition, data conditioner 65 will generate 10 microsecond pulses at a time corresponding to the +90° position of the inverter square wave. This pulse from the data conditioner triggers the data insertion circuit to place a pulse on the inverter line at such a corresponding time relationship. The pulse is thus combined with the inverter signal and passed from the rotor housing through the rotor power supply path to control circuitry external of the rotor housing.

The combined signal is passed to the square wave rejection circuit wherein the square wave is suppressed to leave only the superimposed pulses and transient pulses which are sent to AND gates 74, 76. In the present example, the pulse occuring at a +90° position corresponding to the square wave, will trigger the positive AND gate 76 in coincidence with a signal from the positive clock circuit 73 and thereby operate the torque motor control (second direction) 78. Should the level detector move in an opposite direction, the parallel circuit channel for operating the torque motor control (first direction) would be operated.

It is readily seen that other gateing type circuits can be used to provide a signal which is superimposed upon the inverter signal. Likewise, the circuitry for decoding the superimposed signals and then recombining them to drive a motor in opposite direction is also subject to equivalent embodiments. Therefore, while particular embodiments of the present invention have been shown and described, it is apparent that changes and modifications may be made without departing from this invention in its broader aspects, and therefore, the aim in the above description is to cover all such changes and modifications as fall within the true spirit and scope of this invention.

What is claimed is:

1. In a gyro, means for transferring an electrical control signal from the rotor housing of the gyro to portions exterior to the rotor housing, which means comprises: means on said rotor housing for generating a control signal; means for providing a power signal to the rotor; means on said rotor housing for superimposing said control signal upon the power signal, said power signal and superimposed control signal being carried on a single circuit path; and means exterior of said rotor housing for decoding said superimposed control signal to provide a usable control signal.

2. The apparatus of claim 1 and further including a motor means responsive to said control signal for applying forces to portions of the gyro.

3. The apparatus of claim 1 and further including a torque motor responsive to said control signal for applying a precessing force to an axis of the gyro.

4. In a gyro control system for controlling the tilt of a gyro rotor relative to a predetermined attitude: circuit means for supplying a power signal to a rotor motor on a gyro housing; means on said rotor for sensing a change in the attitude of the rotor relative to the predetermined attitude; circuit means for detecting said sensed change and for generating an error signal in response thereto; circuit means for superimposing said error signal on the power signal to form a combined signal said superimposed error signal being carried on the same circuit path as said power signal; and means for rejecting the power signal component of said combined signal to provide a control signal.

5. In a gyro control system for controlling the tilt of a gyro rotor relative to a predetermined attitude; circuit means for supplying a power signal to a rotor motor on a gyro housing; means on said rotor for sensing a change in the attitude of the rotor relative to the predetermined attitude; circuit means for detecting said sensed change and for generating an error signal in response thereto; circuit means for superimposing said error signal on the power signal to form a combined signal which is carried on the same circuit path as said power signal; means exterior of the gyro housing for applying a force to an axis of the gyro; control means exterior of said housing for operating said force applying means; and circuit means for trnasmitting said combined signal from said gyro housing to said control means exterior of said housing.

6. The apparatus of claim 5 wherein said force applying means is a reversible motor for applying a torque to the vertical axis of the gyro.

7. In a control system, means responsive to a sensed parameter for operating a control function, which means comprises: line means for supplying an operating signal to the system; means for sensing a parameter of the system; means responsive to such sensed parameter for generating a data signal indicative thereof in timed relation to said operating signal; means for superimposing said data signal on said operating signal to form a composite signal; means for separating said data signal from said composite signal and forming a control signal; and means responsive to said control signal for operating a control function.

8. The apparatus of claim 7 wherein said separating and forming means includes a circuit for substantially rejecting the operating signal while passing the data signal, a clock circuit for generating a trigger signal, and a gate circuit responsive to said data signal and trigger signal for forming said control signal.

9. In a control system, means for detecting a parameter and transmitting an indication of such parameter over a single circuit path to a control function, which means comprises: means for providing an input electrical signal on the circuit path; means for generating a control signal in response to the detected parameter; means for superimposing said control signal on said input electrical signal in a timed relationship to form a combined signal; means for rejecting said input electrical signal to leave a pure control signal; means for relating said pure control signal to the timed relationship at which the control signal was superimposed upon said input electrical signal; and means responsive to said related pure control signal for driving a control function.

10. The apparatus of claim 9 wherein said input electrical signal is a power supply signal for operating the system.

11. The apparatus of claim 9 wherein said means for generating a control signal is a series of monostable flip flops that cause a pulse to occur in timed relationship with said input electrical signal.

12. The apparatus of claim 9 wherein said superimposing means is a transistor which has a capacitor as its collector load, which capacitor is coupled to the input electrical signal.

13. The apparatus of claim 9 wherein said relating means includes gate means operable in response to the control signal and the input electrical signal for operating the control function.

14. In a gyro control system, means for detecting tilt of a gyro rotor and transmitting an indication of such tilt to a torque motor, which means comprises: single circuit path means connecting the gyro rotor with the torque motor; means for providing a power supply signal on the circuit path to operate the rotor and the control system; means for generating an error signal in response to the detected tilt; means for superimposing said error signal on said power supply signal to form a combined signal for transmission over said single circuit path; means connected to said single circuit path for rejecting said power supply signal portion of said combined signal, leaving a pure error signal; clock means for relating said error signal to its timed occurrence in the combined signal; torque motor control means; and gate means responsive to the output of said clock means and to the power supply signal for operating said torque motor control means.

15. The apparatus of claim 14 and further including means for determining the direction of tilt and generating corresponding first and second error signals which are time related to positive and negative going portions of the power supply signal depending upon the direction of tilt.

16. The apparatus of claim 15 wherein said superimposing means is arranged to insert said first and second error signal on said power supply signal at plus and minus 90° positions on the signal depending upon the direction of tilt.

17. The apparatus of claim 16 and further including separate clock means for relating each of said first and second error signals with their timed occurrence in the combined signal, and separate gate means responsive to said first and second signals respectively and to said power supply signal for operating said torque motor in first and second directions depending upon the direction of tilt.

* * * * *